United States Patent Office 2,865,805
Patented Dec. 23, 1958

2,865,805

QUATERNARY AMMONIUM NAPHTHALENE AND NAPHTHOL SULFONATES

Martin S. Frant, Ossining, and Sylvan I. Cohen, Flushing, N. Y., assignors to Gallowhur Chemical Corporation, New York, N. Y., a corporation of New York No Drawing. Application May 4, 1954
Serial No. 427,652

13 Claims. (Cl. 167—32)

This invention relates to new and useful chemical compounds constituting the products of reaction of quaternary ammonium compounds and naphthalene or naphthol sulfonic acids or their sodium salts, as well as to the process for preparing the same.

According to the invention, an aqueous solution of a quaternary ammonium compound, such as a quaternary ammonium halide, is reacted with an aqueous solution of a naphthalene sulfonic acid or a naphthol sulfonic acid or a sodium salt thereof, thereby obtaining new water-insoluble compounds which are generally oils but some of which can be crystallized to form solid compounds. The quaternary ammonium naphthalene and naphthol sulfonates thus obtained are characterized by new physical and chemical properties and by useful pesticidal activity.

The quaternary compounds are per se well known and are employed as detergents, emulsifiers and wetting agents. Some quaternary ammonium compounds also exhibit marked fungicidal bacteriostatic or bactericidal activity. In actual use, these quaternary ammonium compounds suffer from the drawback that they are highly water soluble. As a result of this, they cannot be used for the mildewproofing of cloth which is exposed to the elements, nor can they be used as agricultural pesticides because of their solubility in rain and water. There are many other uses for which quaternary ammonium compounds would be suitable if their biological activity were available in a water-insoluble form so as to be resistant to the leaching action of water or precipitation. It has now been discovered that by reacting a quaternary ammonium compound with naphthalene or naphthol sulfonic acids, new and highly useful and valuable compounds are produced which are not only water insoluble, but have marked biological activity.

The quaternary ammonium compound may be any suitable or known quaternary ammonium halide or hydroxide such as benzalkonium chloride or similar compound responding to the general formula $R_4NX$, where N is a pentavalent nitrogen atom directly bonded to four hydrocarbon groups and X is an anion. They may be of the molecular constitution hereinafter set forth by way of example and generally may be of any of the types referred to in the co-pending application of Shibe, Cohen and Frant, Ser. No. 402,604, filed January 6, 1954, now abandoned. Benzalkonium chloride is the well-known common name of alkyl dimethyl benzyl ammonium chloride, wherein alkyl represents a mixture ranging from $C_8H_{17}$ to $C_{18}H_{37}$, in which the lauryl, myristyl and cetyl groups are the most active and predominate.

The invention is illustrated by the following examples, without limiting it thereto:

*Example I*

Thirty-four grams of alkyl dimethylbenzyl ammonium chloride were dissolved in four times its weight in water and to this was added with stirring 25 grams of 1,5-naphthalene disulfonic acid. The reaction product was a yellow-to-tan gummy precipitate which, upon crystallization from acetone-water, melted at 228–240° C. This compound was made up into an emulsifiable solution in equal parts of acetone, isopropanol and non-ionic detergent, and bactericidal tests were carried out using this solution as a result of which it was found that a dilution of one part of active ingredient in 40,000 parts of water was bactericidal against *Aerobacter aerogenes*. In an accelerated mildew-resistance test using *Chaetomium globosum*, 1% by weight of this compound on cotton duck gave 100% protection despite 24 hours of continuous leaching of the treated cloth in running water.

*Example II*

In the same manner as Example I, 37½ grams of alkyl dichlorobenzyl dimethyl ammonium chloride were reacted with 25 grams of 1,5-naphthalene disulfonic acid to form a flocculent yellow precipitate which was removed by filtration to yield a tan solid, melting at 272–282° C. after recrystallization from acetone-water.

*Example III*

In a similar manner, 40 grams of lauryl dimethylbenzyl dimethyl ammonium chloride were dissolved in 110 cc. of water and added to 30 grams of sodium naphthalene 1,5-disulfonate dissolved in 100 cc. of water. A brown oil was precipitated and removed by extraction with benzene. Evaporation of the solvent left a brown solid which was not recrystallized before using.

*Example IV*

In the same manner, aqueous solutions of alkyl dimethyl benzyl ammonium chloride and 1,3,6-naphthalene trisulfonic acid were reacted to yield an oil which, on drying, produced a tan waxy solid. It was found to be highly fungistatic, inhibiting 50% of the germination of spores of *Alternaria oleracea* at a concentration of 3.4 parts per million. The bactericidal concentration was found to be 1:30,000 against *Aerobacter aerogenes*, and a dilution of 200 parts per million of this chemical resulted in 94.3% inhibition of mycelial growth of *Aspergillus niger* when incorporated into potato dextrose agar.

*Example V*

In the same manner, 35 grams of an aqueous solution of dodecylbenzyl trimethyl ammonium chloride were reacted with 32 grams of 1,3,6-naphthalene trisulfonic acid to produce a clear, viscous yellow oil.

*Example VI*

Seventy grams of a 50% aqueous solution of dodecylbenzyl trimethyl ammonium chloride were reacted with 25 grams of sodium 2-naphthol-3,6-disulfonate dissolved in 200 cc. of water to yield a white gummy solid which crystallizes on storage and melts at 82–87° C.

*Example VII*

Similarly, alkyl dimethyl benzyl ammonium chloride was reacted with 2-naphthol-3,6-disulfonic acid in aqueous solution to form a while waxy solid which could be recrystallized from toluene. It was found to be bactericidal against *Aerobacter aerogenes* on one-hour contact when diluted 1:10,000. A dilution of 100 parts per million of this chemical incorporated into potato dextrose agar resulted in 55.5% inhibition of mycelial growth of *Aspergillus niger*.

*Example VIII*

Thirty-five grams of alkyl dichlorobenzyl dimethyl ammonium chloride were dissolved in 140 cc. of water and to this solution a saturated solution of sodium 2-naphthol-3,6-disulfonate was added with vigorous stirring. Almost immediately a white precipitate is formed which was recovered as a yellowish-white solid, melting at 65–70° C.

*Example IX*

Seventy grams of a 50% aqueous solution of alkyl dimethyl benzyl ammonium chloride were reacted with 25 grams of 6,7-dihydroxy-2-naphthalene sulfonic acid to produce a very dark oil which crystallized on long standing.

The invention, therefore, generally comprises the reaction of a quaternary ammonium compound, in particular a quaternary ammonium halide, with naphthalene and naphthol sulfonic acids and their sodium salts to yield new chemical compounds which are usually oils but some of which are in solid or crystalline form. These new compounds are characterized by having properties which differ from the starting materials, and particularly by their altered solubilities and biological activity, which make them especially useful as pesticides, insecticides and as agricultural chemicals. In using the new compounds as pesticides, for example, they are made up as 1–50% solutions, dispersions or emulsions of one or more compounds, and are sprayed or otherwise suitably applied for the control of pests, insects, bacteria, fungi or other micro-organisms.

It is understood that the starting materials set forth above as examples are representative only and that other quaternary ammonium compounds and other naphthalene and naphthol sulfonic acids and sulfonates may be employed within the scope and terms of the appended claims.

We claim:

1. A water-insoluble chemical compound selected from the group consisting of quaternary ammonium naphthalene sulfonates and quaternary ammonium naphthol sulfonates, the quaternary ammonium moiety thereof containing four nitrogen-linked hydrocarbon groups one of which is a higher alkyl group, wherein alkyl represents a mixture ranging from $C_8H_{17}$ to $C_{18}H_{37}$ in which lauryl, myristyl and cetyl radicals are the most active and predominant, two to three of said hydrocarbon groups being lower alkyl groups, and one of said hydrocarbon groups being selected from the group consisting of benzyl, alkyl-substituted benzyl and chloro-substituted benzyl and when three hydrocarbon groups are lower alkyl, the remaining hydrocarbon group is alkyl-substituted benzyl.

2. A compound according to claim 1, in which the higher alkyl group contains at least twelve and not more than eighteen carbon atoms.

3. A pesticidal preparation containing as its active ingredient 1–50% of a compound defined by claim 1.

4. Dodecylbenzyl trimethyl ammonium 1,3,6-naphthalene trisulfonate.

5. A pesticidal preparation containing as its active ingredient 1–50% of the compound of claim 4.

6. Alkyl dimethyl benzyl ammonium 1,5-naphthalene disulfonate, in which alkyl represents a mixture ranging from $C_8H_{17}$ to $C_{18}H_{37}$ wherein lauryl, myristyl and cetyl radicals are the most active and predominant.

7. Alkyl dichlorobenzyl dimethyl ammonium 1,5-naphthalene disulfonate, in which alkyl represents a mixture ranging from $C_8H_{17}$ to $C_{18}H_{37}$ wherein lauryl, myristyl and cetyl radicals are the most active and predominant.

8. Alkyl dimethyl benzyl ammonium 1,3,6-naphthalene trisulfonate, in which alkyl represents a mixture ranging from $C_8H_{17}$ to $C_{18}H_{37}$ wherein lauryl, myristyl and cetyl radicals are the most active and predominant.

9. Alkyl dimethyl benzyl ammonium 2-naphthol 3,6-disulfonate, in which alkyl represents a mixture ranging from $C_8H_{17}$ to $C_{18}H_{37}$ wherein lauryl, myristyl and cetyl radicals are the most active and predominant.

10. Alkyl dichlorobenzyl dimethyl ammonium 2-naphthol-3,6-disulfonate, in which alkyl represents a mixture ranging from $C_8H_{17}$ to $C_{18}H_{37}$ wherein lauryl, myristyl and cetyl radicals are the most active and predominant.

11. Alkyl dimethyl benzyl ammonium 6,7-dihydroxy-2-naphthalene sulfonate, in which alkyl represents a mixture ranging from $C_8H_{17}$ to $C_{18}H_{37}$ wherein lauryl, myristyl and cetyl radicals are the most active and predominant.

12. Lauryl dimethylbenzyl dimethyl ammonium 1,5-naphthalene disulfonate.

13. Dodecylbenzyl trimethyl ammonium 2-naphthol-3,6-disulfonate.

References Cited in the file of this patent

UNITED STATES PATENTS

| | | |
|---|---|---|
| 1,867,022 | Munz et al. | July 12, 1932 |
| 2,271,707 | Munz et al. | Feb. 3, 1942 |
| 2,541,248 | Hibbs | Feb. 13, 1951 |
| 2,583,399 | Wachter et al. | Jan. 22, 1952 |
| 2,605,281 | Blinoff | July 29, 1952 |
| 2,664,444 | Kwartler | Dec. 29, 1953 |
| 2,698,342 | Gaspar et al. | Dec. 28, 1954 |
| 2,759,975 | Chiddix et al. | Aug. 21, 1956 |

FOREIGN PATENTS

| | | |
|---|---|---|
| 455,206 | Italy | Feb. 17, 1950 |

OTHER REFERENCES

Roark et al.: A List of Sulphur Compounds (Exclusive of Mothproofing Materials) Used as Insecticides, Insecticide Div., Bureau of Entomology & Plant Quarantine, U. S. Dept. of Agr. p. 32, May (1935).

Lawrence et al.: J. Am. Pharm. Assn. 36 (1947), 353–8.